Feb. 29, 1944.   A. S. NORCROSS   2,342,685
MEASURING SYSTEM
Filed May 8, 1941
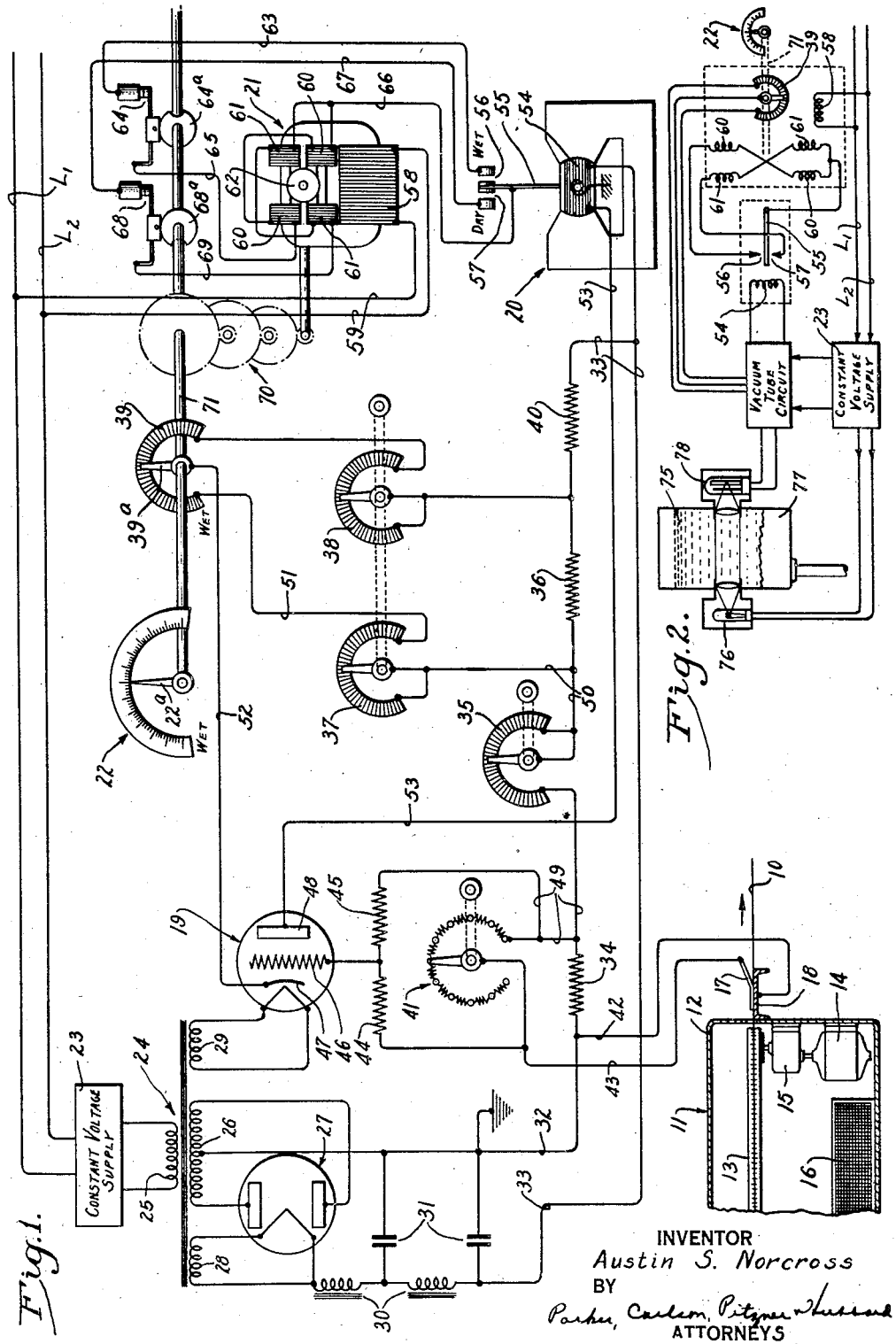
INVENTOR
Austin S. Norcross
BY
Parker, Carlson, Pitzner & Hubbard
ATTORNEYS Patented Feb. 29, 1944

2,342,685

UNITED STATES PATENT OFFICE 2,342,685

MEASURING SYSTEM

Austin S. Norcross, Waban, Mass.

Application May 8, 1941, Serial No. 392,512

7 Claims. (Cl. 175—183)

This invention relates generally to the measurement or detection of physical, chemical or electrical condition changes which are to be controlled or indicated. More particularly, the invention pertains to such a measuring system of the so-called proportioning type wherein the response of the system to a condition change follows and is proportional to, such change.

One object of the invention is to provide a novel system of the above character embodying an improved and simplified arrangement for utilizing a thermionic tube for detecting and amplifying the condition change to which the system responds.

Another object is to provide such a system, utilizing a thermionic tube as the basic detection element, and which system is characterized particularly by its freedom from inaccuracies in operation resulting from capacitance in the apparatus.

Another object is to provide such a system which is particularly adapted for accurate response to changes in electrical resistances of large magnitude.

Still another object is to provide a system of the type indicated, including a novel arrangement for adjusting its sensitivity.

A further object is to provide such a system whose susceptibility to stray fields and polarization of certain of the parts is minimized.

A further object is to provide such a system which is characterized not only by its low cost and precision of operation but also by the minimization in change in operating characteristics throughout a long period of time.

Further objects and advantages of the invention will become apparent from the following detailed description taken in connection with the accompanying drawing, in which Figure 1 is a schematic view and wiring diagram of an indicating apparatus including a measuring system embodying the novel features of the invention.

Fig. 2 is a schematic view showing a different use of the invention.

The invention is applicable to the detection or measurement of changes in a wide variety of conditions for indicating or controlling such conditions. For convenience and simplicity of illustration, the invention has been shown in Fig. 1 and described in detail herein as embodied in an apparatus for indicating the moisture content of a traveling web 10 of cloth. This illustrated indicating apparatus and the alternative use shown in Fig. 2 simply typify the many uses to which the invention may be put. It is to be understood, therefore, that I do not intend to limit the invention by these particular disclosures but aim to cover all modifications, alternative methods, constructions and uses falling within the spirit and scope of the invention as expressed in the appended claims.

Referring now to the particular embodiment shown in Fig. 1, the web of cloth 10 passes through a tenter or drier 11 comprising a housing 12 through which the web is fed by an endless chain 13 carrying the usual clamps (not shown) for gripping opposite side margins of the web. The chain is driven by an electric motor 14 operating through a suitable speed reducer 15. Air for drying the cloth is heated as by an exchanger 16 and preferably maintained at a uniform temperature. The effective capacity of the drier may be varied in several ways as, for example, by varying the speed of the motor 14.

As the web 10 emerges from the tenter 11 (moving to the right as viewed in the drawing), it passes between a pair of electrodes 17, 18 which are connected with an associated apparatus to detect or measure continuously, and in the present instance indicate, the moisture content of the traveling web. By observing the indication thus afforded, the operator is apprised of the sense and amount of adjustment in the drying action of the tenter which should be made to maintain uniformly a desired moisture content in the web. In brief, a small current is conducted through the electrodes 17, 18 and any change in resistance between these electrodes, occasioned as it is by a change in the web's moisture content, results in a change in voltage drop across the electrodes which is detected by a vacuum tube 19, the output of the latter being arranged to actuate a current relay 20 which in turn controls a reversible motor 21 that operates a visual indicator 22 calibrated in terms of moisture content.

Current for operating the system is derived from a suitable alternating current source such as the supply lines $L_1$, $L_2$ which may be an ordinary 115 volt 60 cycle lighting circuit. The detector circuit itself requires a supply of constant voltage, direct current. To afford such a supply, a constant voltage supply 23, energized from the supply lines $L_1$, $L_2$ feeds current to a rectifier system of conventional design. This includes an input transformer 24 having a primary winding 25 and a two-section secondary winding 26 connected to the respective anodes of a full-wave rectifier tube 27. Low voltage windings 28 and 29 on the input transformer 24 serve respectively to supply heating current to the cathodes of the tubes 27 and 19. The rectifier network also includes the usual filter system comprising chokes 30 and capacitors 31.

The output of the rectifier is connected, through output leads 32 and 33, across a voltage divider comprising, in series, a fixed resistor 34, a rheostat 35, a fixed resistor 36, shunted with tandem rheostats 37 and 38 and a tapered potentiometer 39, and a fixed resistor 40. This voltage divider arrangement serves to supply direct current voltages of suitable amounts to various portions of the system. Thus, the voltage drop across the fixed resistor section 34 of the divider is impressed across the electrodes 17, 18 and a series connected variable resistor 41. In particular, one terminal of the fixed resistor 34 is connected through a conductor 42 with the electrode 18 while the other electrode 17 is connected through a conductor 43 with the slider arm of the variable resistance 41, the other terminal of the latter being connected to the remaining terminal of the fixed resistor 34. A pair of fixed resistors 44, 45 are connected in series with each other and in shunt across the variable resistor 41. These resistors 44, 45 are so proportioned that one-third of the voltage across the variable resistor 41 is applied to the control grid 46 of the tube 19, which grid is connected to the mid point of the pair of resistors 44, 45.

The tube 19 has been shown as being a type 85 triode with indirectly heated cathode. In addition to the control grid 46 mentioned above, it includes a cathode 47 and a plate or anode 48.

On the input side of the tube 19, the grid cathode voltage is composed of four components. In particular, it will be seen that the grid-to-cathode circuit extends from the grid 46 through the resistor 45, conductors 49, rheostat 35, conductors 50, rheostat 37, conductor 51, part of potentiometer 39 and conductor 52 to the cathode 47. Thus, one component of the grid-cathode voltage is derived from the drop across the resistor 45, which is one-third of the drop across the variable resistor 41. A second component is derived from the drop across the rheostat 35 and the third component is derived from the drop across the potentiometer 39 between slider 39a and the counter-clockwise end of the winding. The fourth component is derived from the drop across the rheostat 37 and is used in making an initial adjustment of the sensitivity of the system as hereinafter more fully described.

On the output side of the tube 19, the plate-to-cathode circuit extends from the plate 48 through a conductor 53 to the energizing winding 54 of the current relay 20, thence through conductors 33, fixed resistor 40, rheostat 38 and the portion of potentiometer 39 to the right of slider 39a and through conductor 52 back to the cathode 47. From a consideration of the circuit elements as so far described, it will be seen that the voltage drop across the variable resistor 41 is an inverse function of the resistance between the electrodes 17, 18. Thus, as the moisture in the web 10 increases, the resistance between the electrodes 17, 18 decreases so that the voltage drop across the variable resistor 41 proportionately increases. Conversely, when the moisture content of the web 10 decreases, the resistance between the electrodes 17, 18 increases so that the voltage drop across variable resistor 41 decreases. This increase or decrease in the voltage drop across the variable resistor 41 is, of course, reflected in the drop across the resistor 45 that is applied to the control grid 46. The variable resistor 41 can be initially set so that a given moisture content in the web 10 will, when the indicator 22 points to this value of moisture content, cause a preselected voltage to be applied to the control grid 46. This voltage on the grid 46 is so chosen that at that point the output current of the tube 19 will be such that the rotor of the current relay 20 occupies its neutral or mid position shown.

The relay 20 is of the well known D'Arsonval type and includes a movable contact 55 on the rotor 54 which contact is shifted upon an increase in current from a predetermined value to engage a stationary contact 57, and upon a decrease in the current from such value to engage the other stationary contact 58. Thus, when the moisture content of the web 10 increases, the output current of tube 19 is correspondingly decreased so that the rotor 54 of the relay 20 is shifted to the right to close contacts 55 and 58. Similarly, when the moisture content of the web 10 decreases, the output current of tube 19 increases and the relay rotor 54 is oscillated in the opposite direction to close the contacts 55 and 57.

Operation of the relay 20 as noted above in response to changes in the condition of the web 10 is utilized to operate the indicator 22 for showing the moisture content of the web. For this purpose, the contacts of the relay 20 are arranged to control the energization of the reversible motor 21. This motor is herein shown as being of the shaded pole induction type, having a main winding 58 energized through leads 59 from the supply lines L1, L2 as well as alternatively available pairs of shading windings 60 and 61 which are short-circuited by closure of respective ones of the relay contacts 56 and 57 to cause the motor rotor 62 to revolve in corresponding directions. When the contacts 55, 56 are closed, the shading windings 60 are shorted through a circuit extending through contact 56, conductor 63, limit switch 64, conductor 65, shading windings 60 and conductor 66 back to the movable relay contact 55. Similarly, when the relay contacts 55, 57 are closed, the other pair of shading windings 61 are shorted through a circuit leading from the contact 57 through conductor 67, limit switch 68, conductor 69, shading windings 61 and the conductor 66 back to the relay contact 55. The motor rotor 62 is connected through a speed reduction gearing 70 with a driven shaft 71 which carries not only the pointer 22a of the visual indicator 22 but also the sliding contact 39a of the potentiometer 39, as well as operating cams 64a and 68a of the limit switches 64 and 68 respectively. The limit switches 64 and 68 operate in a well known manner to open circuit the respective sets of shading windings on the motor 21 when the latter has revolved to corresponding limit positions, thereby preventing the indicator 22 from going off scale.

The change in setting of the potentiometer 39 incident to the turning of the motor 21 serves to restore the system to a condition of balance, for it will be recalled that this potentiometer is included in the input or grid circuit of the tube 19 and furnishes one of the four components of potential utilized in the grid circuit. When, for example, the moisture content of the web 10 decreases, the voltage derived from the resistor 45 will decrease as heretofore described. Accordingly, the output current of the tube 19 will be increased and the relay contacts 55, 57 closed so that the motor 21 revolves the slider 39ᵃ of the potentiometer 39 in a clockwise direction as also heretofore described, thereby increasing the voltage drop from the potentiometer 39 applied to the control grid 46. The setting of the potentiometer 39 is progressively changed in this manner until the total grid voltage is again restored to its initial condition, whereupon the relay 29 returns to the neutral position shown and adjustment of the potentiometer 39 is arrested. The position of the potentiometer arm 39ᵃ is shown by the indicator needle 22ᵃ and scale 22 which may be marked to read moisture content directly. Consequently, the operator is immediately and continuously informed of any departure from normal of the moisture content of the web 10. It will be understood, of course, that when the moisture content of the web 10 increases, the same type of automatic adjustment takes place but in an opposite sense. In order that scale 22 will be more nearly linear, the left half of winding 39 is made of greater resistance than the right half, the ratio being approximately three to one in the exemplary application.

In some instances, it is desirable to vary the sensitivity of the system described. For example, the resistance of the web 10 will vary at different rates with changes in moisture content depending upon the particular type of cloth or other material of which the web is made. Under such circumstances, it is desirable to adjust the sensitivity of the system proportionately to the rate of change of resistance with relation to a change in moisture content. It is to accommodate such change in sensitivity that the rheostats 37 and 38 have been included in the illustrative circuit. As heretofore noted, these rheostats are tandem connected, that is, their movable sliders are mounted on a single actuating shaft. It will be observed that these rheostats are interposed in the leads from the respective terminals of the voltage divider section 36 and by this means a part of the voltage drop across this section 36 is impressed upon the potentiometer 39. The resistance values of the rheostats 37 and 38 are so chosen with relation to the constants of the associated circuit elements that the voltage on the slider 39ᵃ of the potentiometer 39 is substantially constant when the slider is in its mid position shown, irrespective of the setting of the rheostats 37, 38, but the rate of voltage increase or decrease accompanying slider movement from this center position is dependent upon the setting of the rheostats 37, 38. By turning the tandem connected rheostats 37, 38 to the right as viewed in the drawing, the voltage applied across the potentiometer 39 is increased so that the angle through which the potentiometer slider need be turned in effecting a particular compensation action in the circuit is diminished. Conversely, when the rheostats 37, 38 are turned in the opposite direction to increase the voltage drop therein, the voltage across the potentiometer is diminished so that the angle through which it must be turned is increased. A very simple means is thus afforded for varying the sensitivity of the system.

With the particular circuit arrangement shown in the drawing, if the output of the rectifier network is 240 volts, it has been found that good results can be obtained when the circuit constants are as follows: resistor 34 is 6000 ohms; rheostat 35 is 300 ohms; resistor 36 is 2000 ohms; resistor 40 is 8500 ohms; rheostat 37 is 1500 ohms; rheostat 38 is 2500 ohms; potentiometer 39 is 2000 ohms; divider resistance 44 is 1500 megohms; divider resistance 45 is 750 megohms. Under such circumstances, the total voltage on the grid 46 will be about 21 volts, the value required to balance relay 29. Adjustment in the value of this voltage to correlate it with differences in characteristics of associated elements, when such elements are replaced for any reason, may be made by changing the setting of the rheostat 35. The potential across the electrodes 17, 18 will, on the other hand, be about seventy-two volts. The use of this fairly high voltage across the electrodes is quite desirable since it makes the circuit less susceptible to stray fields, and electrode polarization.

Also, particularly advantageous in the system described is the use of a direct current potential on the electrodes as contrasted with an alternating current potential. Among the advantages is the fact that faulty operation due to unavoidable capacity couplings in the circuit is substantially eliminated. In this connection, it should be noted that the proximity of moving belts, etc., in a tenter installation makes it necessary to shield the electrode lead 43 against electrostatic voltages generated by the belts and the like. Such shielded leads and the electrodes themselves have an appreciable capacitance. When a direct current voltage is applied to the electrodes, as in the present circuit, the capacitance has no effect other than to cause transient charging currents whenever the electrode voltage changes. These transients are, for present purposes, negligible. On the other hand, when an alternating current potential is applied to the electrodes both the capacitance and resistance go to make up the effective impedance. Since the capacitance does not vary with the moisture content of the web as does the resistance, false indications would be likely if an alternating current potential were used, this error being due to the impedance introduced by the capacitance, particularly in instances where the web has a resistance of over 100 megohms, as is often the case with material such as rayon or paper. As noted, however, this difficulty is effectually overcome by the use of direct current potential on the electrodes since the effect of the capacitance of the circuit is then negligible. The use of a direct current potential in the network on the input side of the tube 19 does not lead to a plate current having a ripple, which it would have if an alternating current potential were used on the input side, so that the current relay 29 can be connected directly in the output circuit and without the interposition of a transformer or similar coupling device.

The invention is, of course, applicable to many other uses involving the measurement of very high resistances. As one of the many examples, the improved circuit is shown in Fig. 2 as applied to the measurement of the color of a solution 75 which might, for example, be water under treatment, the stack supply of a paper-making machine, sewage, etc. For this purpose, a beam of light derived from a lamp 76 is projected through the liquid in a tank 77 and impinges on a photoelectric cell 78 which constitutes the variable high resistance whose value is to be measured. Changes in the light intensity vary the resistance of the cell which is substituted in the improved circuit in place of the electrodes 17 and 18 with the cloth 10 therebetween. The indicator would, of course, be calibrated in terms of the condition being measured.

I claim as my invention:

1. In a system for measuring a variable electrical resistance, the combination of a thermionic tube and an input circuit and an output circuit, a resistance in series with said variable resistance, means for impressing a substantially constant direct current voltage across said series connected resistances, means for applying a predetermined portion of the voltage drop across one of said resistances as a first control potential to said input circuit, means including a variable-setting potentiometer for applying a second direct current control potential to said input circuit, and means automatically responsive to changes in current in said output circuit to vary the setting of said potentiometer in accordance with such changes and compensate for changes in said first control potential in a sense to restore said output current to a predetermined value.

2. In a system for measuring a variable electrical resistance, the combination of a thermionic tube having an input circuit and an output circuit, a resistance network in series with said variable resistance and comprising a variable resistance and a multi-section voltage divider in shunt therewith, means for impressing a substantially constant direct current voltage across said series connected resistance network and variable resistance, means for applying the voltage drop across one of said voltage divider sections as a first control potential to said input circuit, adjustable means for applying a second control potential to said input circuit, and means acting automatically to vary the setting of said last mentioned means in accordance with changes in said first control potential and restore current in said output circuit to a predetermined value.

3. In a system for measuring the electrical resistance of a medium, the combination of a thermionic tube having an anode and a cathode and a control grid, a resistance network connected in series with the resistance being measured, said network comprising a variable resistor and a multi-section voltage divider in shunt therewith, means for impressing a substantially constant direct current voltage across said series connected resistance network and the resistance being measured, means for connecting an intermediate point on said voltage divider to said grid, an adjustable potentiometer having input and output terminals, means for applying a second direct current voltage to the input terminals of said potentiometer, means for connecting one end of said voltage divider to one output terminal of said potentiometer and for connecting the other output terminal of said potentiometer to said cathode, and means responsive to changes in the output current of said tube between the cathode and anode for automatically varying the setting of said potentiometer in a sense and to an extent required to restore said output current to a preselected value.

4. In a system for measuring a variable electrical resistance, the combination of a thermionic tube having an input circuit and an output circuit, means for applying a first control potential to said input circuit varying in accordance with changes in said variable resistance, means including an adjustable-setting potentiometer for applying a second control potential to said input circuit, means operable in response to changes in the output of said tube from a predetermined normal value for changing the setting of said potentiometer from a predetermined mid position of the latter in a sense to compensate for changes in said first control potential, and sensitivity-adjustment means operable at will to vary the ratio between the degree of change in the setting of said potentiometer and the corresponding change effected by such setting in said second control potential but without effecting a substantial change in the potential across the output terminals of said potentiometer when it is in said mid position thereof.

5. In a system for measuring a variable electrical resistance, the combination of a thermionic tube having an input circuit and an output circuit, means for applying a first control potential to said input circuit varying in accordance with changes in said variable resistance, means including an adjustable-setting potentiometer for applying a second control potential to said input circuit, said potentiometer having a pair of input terminals, a source of direct current potential connected to said terminals, and a pair of tandem connected rheostats interposed in the connections from said source of potential to respective ones of said terminals for adjustably varying the change in said second control potential afforded by a predetermined change in the setting of said potentiometer.

6. In a system for measuring a variable electrical resistance, the combination of a thermionic tube having an input circuit and an output circuit, means for impressing a direct current potential across the variable resistance which is to be measured and which potential is substantially constant when the value of said resistance is constant, means for applying to said input circuit a direct current control potential of substantially lower order of magnitude than the first-mentioned potential and the value of which is of predetermined ratio to the current caused to flow through said variable resistance by said first-mentioned potential, adjustable means for applying a second control potential to said input circuit, and means acting automatically in response to changes in current in said output circuit to vary the settings of said last-mentioned means in accordance with such changes and compensate for changes in the first-mentioned control potential in a sense to restore said output current to a predetermined value.

7. The combination of a variable electrical resistance having a comparatively high direct current voltage impressed thereon, said voltage being constant when the value of said resistance is constant, a thermionic tube having an input circuit and an output circuit, means for impressing on said input circuit a substantially lower direct current voltage varying as a function of the changes in the value of said resistance and constituting a first control potential, means including a variable setting potentiometer for applying a second direct current control potential to said input circuit, and means automatically responsive to changes in the current in said output circuit to vary the setting of said potentiometer in accordance with such changes and compensate for changes in said first control potential in a sense to restore said output current to a predetermined value.

AUSTIN S. NORCROSS.